US010019140B1

(12) United States Patent
Bell et al.

(10) Patent No.: US 10,019,140 B1
(45) Date of Patent: Jul. 10, 2018

(54) ONE-HANDED ZOOM

(71) Applicant: Amazon Technologies, Inc., Reno, NV (US)

(72) Inventors: Matthew Paul Bell, Sunol, CA (US); Peter Cheng, Sunnyvale, CA (US); Stephen Michael Polansky, Sunnyvale, CA (US); Amber Nalu, Sunnyvale, CA (US); Alexander Li Honda, Sunnyvale, CA (US); Yi Ding, Santa Clara, CA (US); David Wayne Stafford, Cupertino, CA (US); Kenneth Mark Karakotsios, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 292 days.

(21) Appl. No.: 14/316,677

(22) Filed: Jun. 26, 2014

(51) Int. Cl.
  *G06F 3/048* (2013.01)
  *G06F 3/0484* (2013.01)
(52) U.S. Cl.
  CPC .................................. *G06F 3/0484* (2013.01)
(58) Field of Classification Search
  CPC ....................................................... G06F 3/048
  See application file for complete search history.

(56) References Cited

U.S. PATENT DOCUMENTS

| | | | | |
|---|---|---|---|---|
| 8,977,987 B1* | 3/2015 | Korn | ........................ | G06F 3/016 715/702 |
| 2002/0175896 A1* | 11/2002 | Vaananen | ............. | G06F 1/1626 345/158 |
| 2009/0141147 A1* | 6/2009 | Alberts | .................... | G06F 3/012 348/240.99 |
| 2010/0302281 A1* | 12/2010 | Kim | .................... | G06F 3/04883 345/661 |
| 2012/0154294 A1* | 6/2012 | Hinckley | .............. | G06F 1/1649 345/173 |
| 2012/0257072 A1* | 10/2012 | Jirman | .................... | G06T 11/00 348/222.1 |
| 2013/0104076 A1* | 4/2013 | Cristescu | .............. | G06F 3/0485 715/800 |

* cited by examiner

*Primary Examiner* — Xuyang Xia
(74) *Attorney, Agent, or Firm* — Polsinelli LLP

(57) ABSTRACT

Approaches are described for managing a display of content on a computing device. Content (e.g., images, application data, etc.) is displayed on an interface of the device. An activation movement performed by a user (e.g., a double-tap) can cause the device to enable a content view control mode (such as a zoom control mode) that can be used to adjust a portion of the content being displayed on the interface. The activation movement can also be used to set an area of interest and display a graphical element indicating that the content view control mode is activated. In response to a motion being detected (e.g., a forward tilt or backward of the device), the device can adjust a portion of the content being displayed on the interface, such as displaying a "zoomed-in" portion or a "zoomed-out" portion of the image.

20 Claims, 9 Drawing Sheets

ONE-HANDED ZOOM

BACKGROUND

As computing devices offer increasing processing capacity and functionality, users are able to operate these devices in an expanding variety of ways. For example, cameras on mobile devices are capable of capturing high resolution images and delivering an image scaled or windowed to a modest resolution for further use by the user. In some instances, however, there can be an issue of how to control features that modify the image being captured or content displayed on a screen, such as a digital zoom feature. As such, a variety of approaches to enable and/or control these features have been offered on these devices, such as virtual buttons on the screen of the computing devices or re-purposed physical buttons. Other approaches include, for example, touch-based gesture input where a user touches a touch-sensitive surface with two fingers and pinches the fingers together or apart to scale an image on a screen. Oftentimes, however, a user may be unable to perform a two finger gesture when attempting to hold and operate a device with only one hand. As technology evolves and as the features offered on computing devices expand, the way in which users interact and control these devices is changing.

BRIEF DESCRIPTION OF THE DRAWINGS

Various embodiments in accordance with the present disclosure will be described with reference to the drawings, in which.

DETAILED DESCRIPTION

Figure 1A:
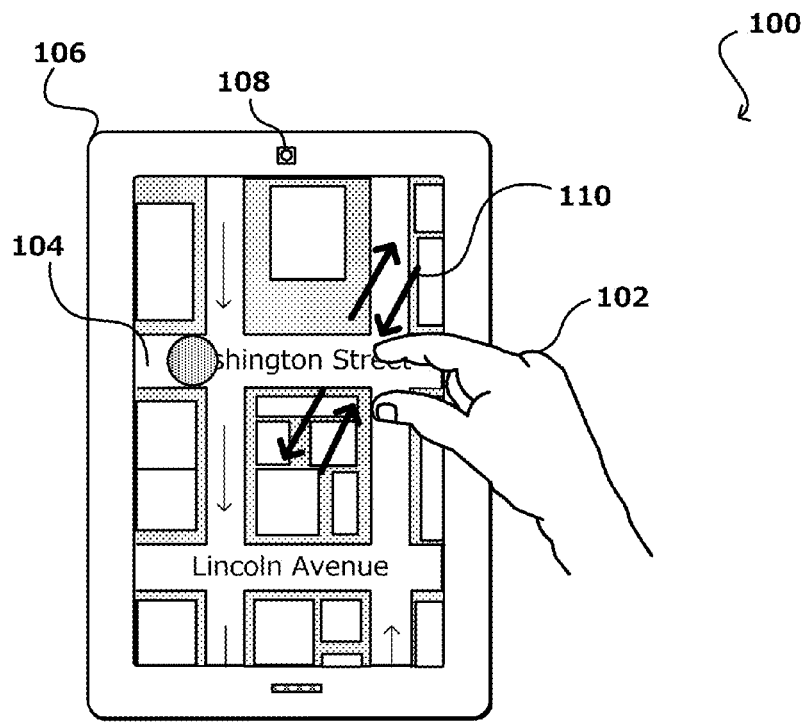
FIGS. 1A, 1B, and 1C illustrate an example implementation where a user is performing a touch-based gesture input to adjust an amount of zoom in accordance with an embodiment.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing a display of content, via an electronic device. In particular, various embodiments enable single-handed approaches to adjusting content displayed on a display element of a computing device. For example, the computing device (e.g., a mobile phone) or other portable computing device can detect a touch-based gesture input (e.g., a double-tap) on a display element or other area of the device, or other touch-based gesture input (e.g., pressure input, etc.) in a particular pattern in order to activate a content control view mode (e.g., a zoom mode). When operating in the zoom mode and in response to a change in the relative position of the device, a portion of content being displayed on the computing device can be adjusted, for example, by zooming-in or zooming-out on the content.

For example, in accordance with various embodiments, an image or other content can be displayed on an interface or other display element of a computing device. The image can be acquired using one or more camera or other sensor(s) of the computing device. The content can be generated from any number of applications, such as from a mapping application, a web browser, etc. An activation gesture or other touch-based gesture input being performed by a viewer of the computing device (such as a double-tap on a display element of the computing device) can be detected. The activation gesture can cause the device to enable a content view control mode (e.g., a zoom mode) or other such mode that can be used to adjust or otherwise modify a portion of the content being displayed on the display element. The activation gesture can also cause to be displayed a graphical element proximate to an area that received the touch-based input, the graphical element indicating that the content view control mode is activated. The device can cause the displayed content corresponding to the area of interest to be centered on the display element. In response to a motion (such as tilting the device forward or backward) being detected relative to the viewer, the device can adjust a portion of the image being displayed on the interface, such as displaying a "zoomed-in" or "zoomed-out" portion of the image, which can be accomplished using an optical zoom and/or digital zoom as known for imaging applications.

Accordingly, in accordance with various embodiments, various approaches provide a viewer with an appearance or view of the content that is based at least in part upon a current relative position and/or orientation of the viewer with respect to the device, as well as changes in that relative position and/or orientation. The content can include various portions, and different adjustments can be applied to each portion based upon these and/or other such changes. These adjustments can include, for example, changes due to a zoom or magnification amount, which when added to the rendered content in response to relative movement between a viewer and a device can enhance the experience of the viewer by allowing for single-handed zooming. For example, in accordance with various embodiments, portions of content displayed on a computing device can be zoomed-in or zoomed-out on based single-handed operation of a computing device. As the viewer holds the device and tilts, rotates, or otherwise changes the orientation of the device, or as the viewer's relative position or orientation changes with respect to the device, the content can appear to be zoomed-in or zoomed-out on, or otherwise change shape or appearance. The relative movements can be based upon factors such as the distance of the viewer to the device, a direction of movement of the user, a direction of change in orientation of the device, or other such factors.

In various embodiments, the relative position and/or orientation of a viewer of a computing device can be determined using at least one image capture element or sensor (e.g., gyroscope, accelerometer, etc.) of the device. For example, the feed from a video camera can be analyzed to locate a relative position of the viewer in the video feed, which can be analyzed to determine the relative direction of the viewer. In other embodiments, one or more digital still cameras can capture images periodically, in response to detected movement of the viewer and/or device, or at other appropriate times, which then can be analyzed to attempt to determine viewer position, as distance can often be determined in addition to direction when analyzing multiple sources of information from different locations. Distance can be determined, for example, using stereoscopic imaging or proximity sensing, among other such options. In some embodiments, infrared (IR) imaging can be used to detect specific features of the viewer, such as the viewer's eyes, for use in determining and/or tracking the location of the viewer. In still other embodiments, changes in the orientation and/or position of the device can be determined using at least one motion sensor of the device, in order to provide for a higher sampling frequency than might otherwise be possible using the image information captured by the camera, or otherwise attempt to improve the relative position determinations. For example, the device can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed.

Various other functions and advantages are described and suggested below as may be provided in accordance with the various embodiments.

Figures 1B, 1C:
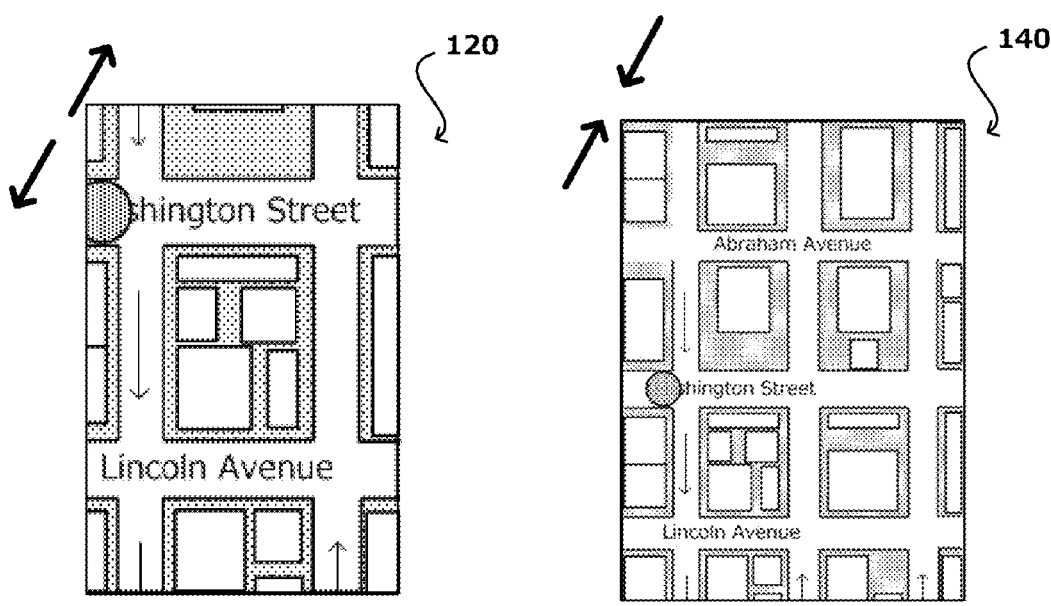

FIGS. 1A, 1B, and 1C illustrate an example implementation where a user is performing a touch-based gesture input to adjust an appearance of content displayed on a display screen of a computing device in accordance with an embodiment. As shown in situation 100 FIG. 1A, a user 102 is performing a pinch-to-zoom touch-based gesture input on a display screen 104 of a computing device 106 (such as a mobile phone or other portable computing device) to zoom in or zoom out on the displayed content. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., electrical watches, augmented reality glasses, biometric monitoring devices, etc.), accessory devices (e.g., remote controls, bicycle electronic devices, active styluses, etc.)), food appliances, fitness devices, and card readers, among others. In this example, the computing device 106 includes a camera 108 positioned on the front of the device such that the imaging element will likely be able to capture image information of at least a portion of the user while the user is viewing content displayed on the device. For example, the imaging element 108 in FIG. 1A is on the front of the device such that an angular capture range of the imaging element can image at least a portion of the user while the viewer is viewing content displayed on the display element of the electronic device.

Using a conventional approach, if the user wants to activate a content view control mode such as a zoom control mode that enables the device to "zoom-in" and/or "zoom-out" of the image or content displayed on the device, the user would typically interact with the device by selecting an icon or other selectable element such as a slider bar on the interface on the device to enable a desired image view control mode. Other approaches include, for example, touch-based gesture input where a user touches a touch-sensitive surface with two fingers and pinches the fingers together or a part 110 to scale an image or content on the display element. For example, example 120 of FIG. 1B is an example of a user zooming-in on the content displayed on the display screen by performing a zoom gesture that includes the user contacting the display screen at two points and separates those points by some desired distance while maintaining contact with the display screen. Accordingly, in this example, to enlarge (e.g., zoom-in) an area of content, the user has to use two hands—one hand to hold the device and another hand to perform the zoom gesture. Example 140 of FIG. 1C is an example of a user zooming-out on the content displayed on the display screen using two hands. In this example, to zoom-out on an area of content the user performs a pinch gesture that includes the user holding the device in one hand and using fingers of the other hand to contact the display screen at two separated points and bringing the two contact points together. Oftentimes, however, a user may be unable to perform a two finger gesture when attempting to hold and operate a device with only one hand.

Accordingly, in accordance with various embodiments, approaches enable a user to activate a single-handed zooming mode to, for example, enlarge or reduce displayed content or other image or content information. In this way, a viewer of a display element of a computing device can activate a content view control mode (e.g., a zoom mode) using a single hand, for example, by double-tapping on the display element. Thereafter, tilting the device forward or backward relative to the viewer of the display element or other reference point can cause a zoom-in or zoom-out function to be executed, where the content displayed can be enlarged or reduced based at least in part on the function executed. A second double-tap or no sufficient movement of the device relative the viewer of the device for a predetermined period of time can deactivate the content view control mode and return the display to an initial state with a basic display size after a zoom-in or zoom-out action.

Figure 2A:
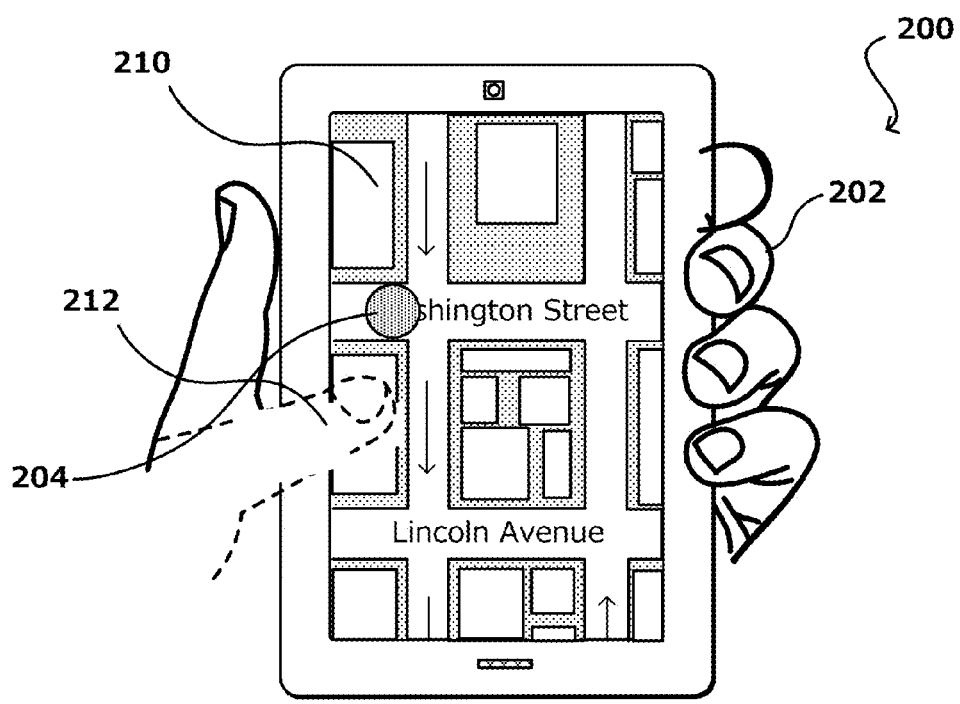
FIGS. 2A and 2B illustrate an approach to activating a content view control mode using a touch-based gesture input in accordance with an embodiment.
Figure 2B:
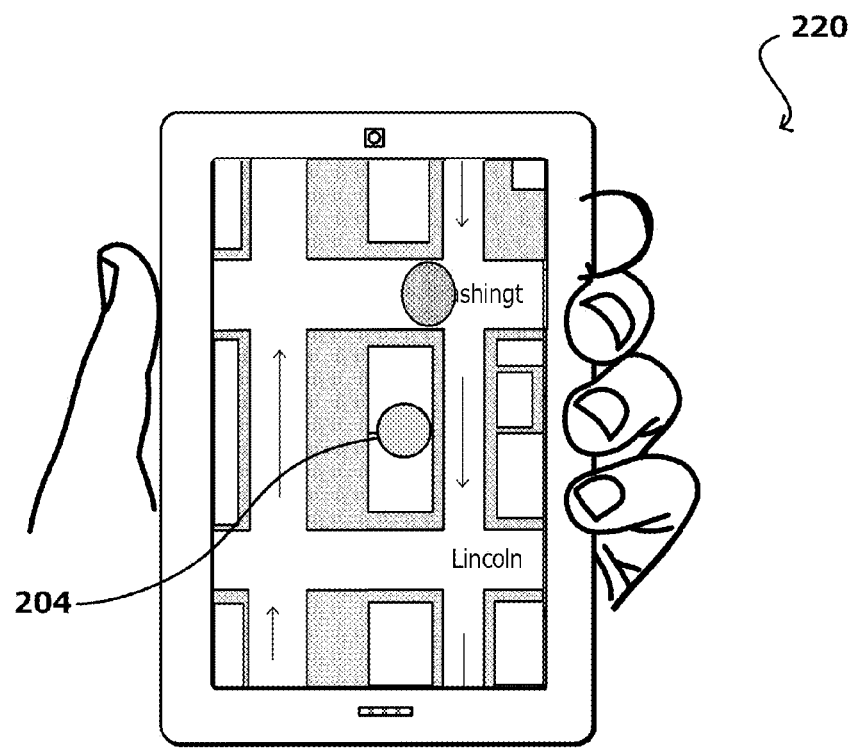
Figure 3A:
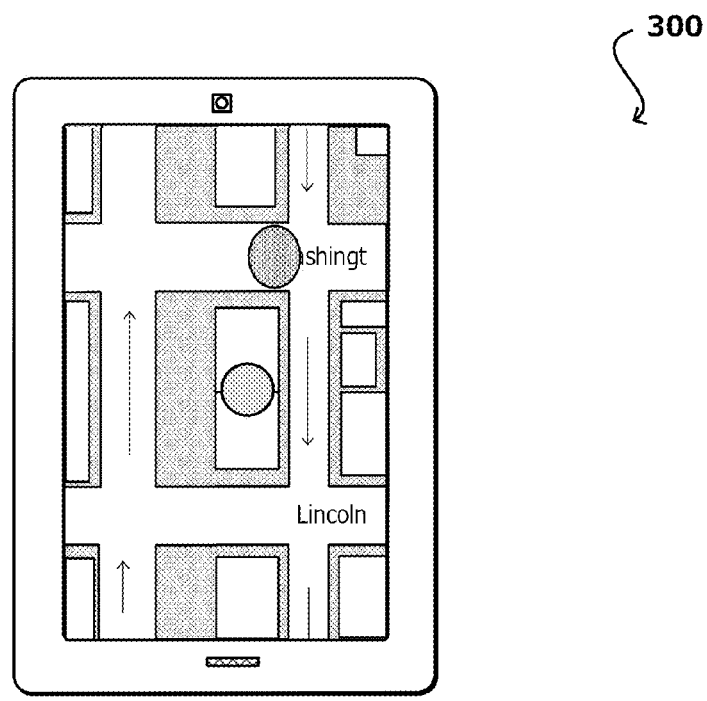
FIGS. 3A, 3B, and 3C illustrates an example implementation where a motion of a device causes an appearance of at least a portion of content to be adjusted based on an enabled content view control mode in accordance with an embodiment.
Figures 3B, 3C:
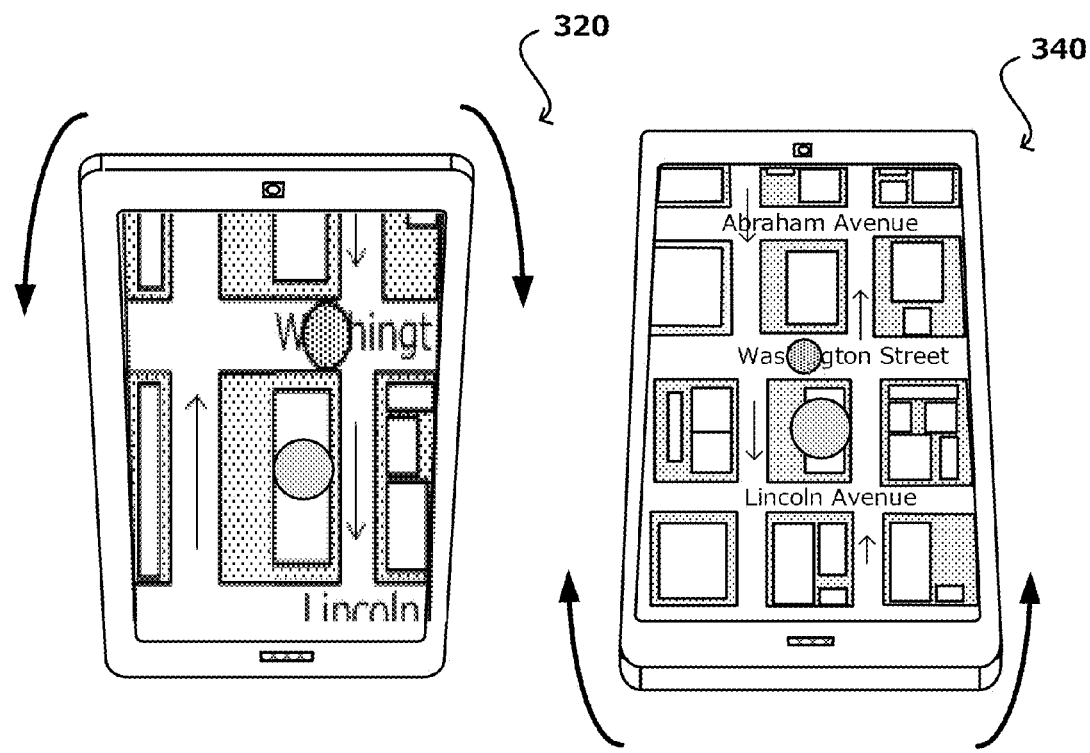

For example, FIGS. 2A and 2B illustrate an approach to activating a content view control mode (e.g., zoom mood) using an activation gesture such as a touch-based gesture input and FIGS. 3A, 3B, and 3C illustrate an approach to adjusting content on a display screen, the activating and adjusting being performed using a single-handed approach. As shown in 200 of FIG. 2A, a user 202 activates a content view control mode (e.g., a zoom mode) using a single-handed approach, for example, by double-tapping on the display element 210 using a thumb 212 or other finger of the hand holding the device. As described, the zoom mode can be used to, for example, enlarge or reduce displayed content or other image data. It should be noted that although the example shown in this figure illustrates a double-tap used as an activation gesture, the various embodiments described herein are not limited to this particular activation gesture. Various alternative activation movements can be used within the scope of the embodiments described herein, as will be evident to one or ordinary skill in the art, such as a triple-tap, a shaking movement, moving the device away from the user, voice command, pressure input such a "squeeze input", or any other activation gesture, event, or combination thereof. For example, various embodiments of the present disclosure can provide a method of detecting tap-based user input on the back and/or sides of the computing device using at least one motion sensor (e.g., by itself or in combination with other types of touch input components). There may be multiple types of sensors that are potentially useful on mobile devices for this type of detection (e.g., an accelerometer, a gyroscope, magnetic proximity sensor, light-based proximity sensor, and a microphone, among others)). The microphone may be employed for specific durations of time and/or in a low-power state mode to avoid unnecessary battery drain. In some aspects, the accelerometer and/or gyroscope outputs are used to determine the tap-based user input. The gyroscope is configured to detect rotational forces (e.g., yaw, roll, pitch), and the accelerometer is configured to detect forces that are linear in nature.

Additionally, in accordance with an embodiment, depressing a button (such as a physical button, volume button, etc.) on the device can be used cause the device to activate a content control view mode, such as a zoom control mode. Thereafter, moving the device while the button is depressed can cause the device to zoom or otherwise adjust the image displayed on the device.

Once the user has activated the content view control mode, a graphical element 204 can be displayed proximate to an area that received the double-tap. The graphical element can provide a visual indication that the content view control mode is activated. In some situations, activating the content view control mode can cause an audio and/or haptic feedback indication that the content view control mode is activated. It should be noted that although the graphical element is represented as a circle, any shape, object, text, or effect can be used to indicate that the content view control mode is activated. For example, a translucent circle or bubble can be displayed around the area of interest to indicate the user is in zoom mode. Further, the graphical element can be positioned in any number of positions on the display element and is not limited the position or area of interest where the double-tap or other touch-based gesture input occurred. Once the content view control mode is activated, the content can be centered in the display screen based at least in part on area of the content that received the double-tap. This can include, for example, zooming-in on the area of interest at a predefined zoom level.

For example, as shown in situation 220 of FIG. 2B, the device can cause the displayed content corresponding to the area of interest to be centered on the display element. This can include, for example, displaying an animation where the content is shifted and/or otherwise panned to display the area of interest in the center of the display element. Various other approaches can be used as well, such as fading-in and fading-out the content, where the resulting display includes the area of interest positioned in the center of the display element. In accordance with various embodiments, fading-in is a term used to describe, for example, a transition effect caused by the computing device using image editing software where content is transitioned from a first view to a second view. This can include, for example, transitioning the content from a blank display to displayed content. Fading-out is a term used to describe, for example, a transition effect caused by the computing device using image editing software where content is transitioned from a first view to a second view. This can include, for example, transitioning the content from a view to a blank screen. The content is zoomed a default or predetermined amount.

In accordance with various embodiments, zooming can include, for example, decreasing the percentage the image shown at any given time or increasing the display size of a portion of an image or taking information from a subset of pixels and causing that information to be displayed over a larger region of the screen. The predetermined amount can be based on a number of factors. For example, the default zoom can be based at least in part on a type of content displayed. The types of content can include, for example, text, images, video, graphical elements, etc. Accordingly, if the user activates the zoom mode by indicating particular content, the device will apply a particular zoom amount based on the content indicated. For example, if the user activates the zoom mode by double-tapping an image, the device will apply a zoom level (e.g., an amount of zoom) such that the image is displayed using the full width of a display screen of the device.

In accordance with various embodiments, the predetermined zoom amount may not be a desired zoom level for a user of the device. For example, the user may adjust the zoom level to zoom-in or out on the content being displayed after the predetermined zoom amount is applied. Accordingly, the predetermined zoom amount can be adjusted based at least in part on this feedback. For example, in accordance with various embodiments, a log of the user's adjustment amount (e.g., an amount the user zooms-in or zooms-out) for various content can be maintained and the predetermined zoom amount can be adjusted based at least in part on the log. In this way, if it is determined that the user tends to zoom-in on text after the predetermined zoom amount is applied, the device can adjust the predetermined zoom amount to zoom-in further on text when the user activates the zoom mode.

Thereafter, tilting the device forward or backward relative to a viewer of the display element can cause a zoom-in or zoom-out function to be executed, where the content displayed can be enlarged or reduced based at least in part on the function executed. For example, based on a determined z coordinate representing the physical distance between the viewer and device, a portion of the content can be rendered to appear larger by using more of the pixels to display those portions, while other portions are not displayed. Additionally or alternatively, portions of content can be rendered to appear smaller, where additional content is displayed using pixels previously used to display the portion that is being rendered to appear smaller. In another example, where a user zooms-in, the user tilts the device towards the user such as by rotating along a primary axis of the device and the device modifies the image displayed on the interface by, e.g., sub-sampling and cropping the image up to a max crop factor, where the max crop factor can be tailored to the display of the device. In the situation where a user zooms-out, the user tilts the device away from user such as by rotating along a primary axis of the device, which causes the device to modify the image displayed on the interface by, e.g., displaying the entire object by using all the available pixels. It should be noted that various embodiments apply in the context of displaying content as well as rendering or generating content, wherein the rendered data can be used to display such content.

Accordingly, in accordance with an embodiment, FIG. 3A illustrates a situation 300 where the zoom mode is activated and the content has been shifted such that the area of interest is positioned in the center of the display element. In this example, the content is displayed to provide a viewer with a view of the content that is based at least in part upon a current relative position and/or orientation of the viewer with respect to the device. The user can zoom-in on the content by tilting the device towards the user as shown in example 320 of FIG. 3B and can zoom-out out on the content by tilting the device away from the user as shown in example 340 of FIG. 3C. In the situation where a user zooms-in, the user tilts the device towards the user such as by rotating along a primary axis of the device and the device modifies the image displayed on the interface by, e.g., sub-sampling and cropping the image up to a max crop factor, where the max crop factor can be tailored to the display of the device. For example, if the display of the device is 1 MP, then the device would crop the image one-to-one. As can be seen, the rotation of the device triggered a corresponding change in the map information displayed on the device. For example, instead of seeing the view of the map in FIG. 3A, the map has view includes an enlarged view of the map centered proximate to the area of interest. In other situations, zooming-in can display additional information. For example, in a maps application, zooming-in can show additional streets, places of interest such as restaurants, attractions, etc., can cause the text size of map labels to increase, among other such features and actions.

In the situation where a user zooms-out, the user tilts the device away from user such as by rotating along a primary axis of the device, which causes the device to modify the image displayed on the interface by, e.g., displaying the entire object by using all the available pixels. In other situations, zooming-in can show an enlarged view of the area of interest. Zooming-out can include displaying additional content on the display element. For example, in a maps application additional geographic area can be displayed. In other application, the content can be scaled to fit on the display screen. As described, it should be noted that various embodiments apply in the context of displaying content as well as rendering or generating content, wherein the rendered data can be used to display such content.

In certain embodiments, zooming occurs when a threshold amount of tilt is detected for at least a predetermined period of time. For example, when the device is tilted at least a threshold angle and maintains that position for a predetermined period of time, a zooming operation is applied to the content displayed on the display element. In various embodiments, such an approach may only apply to an initial threshold, wherein changes in the angle of the device greater than the initial threshold result in substantially immediate changes in the zoom applied. As the relative position of the viewer and/or orientation of the device changes, the updated position information can used to adjust the amount of zoom applied to the content. For example, the speed of zooming can be controlled by the angle at which the device is tipped (e.g., shallow=slower, steep=faster). Accordingly, the zoom amount corresponds to changes in the relative angle, or position of the viewer relative to the device.

For example, as changes in the relative position, direction, and/or orientation between the viewer and device are determined, a set of scaling or zoom equations to adjust a zoom level for the content is determined. The equations can be used to adjust the amount of zoom applied to correspond to changes in the relative viewing angle of the viewer and/or device. In this way, the equations can be used to apply an amount of scale or zoom to the content. In some embodiments, rather than apply one or more scale equations, there can be a plurality of discrete zoom levels, where each zoom level can correspond to an amount of tilt of the device. For example, an amount of tilt reaching a first threshold can cause the zoom to adjust a first amount and an amount of tilt reaching a second threshold can cause the zoom to adjust a second amount. In this example, the first amount of zoom can be greater than the second amount of zoom. The threshold can be any defined threshold. For example, the first threshold can correspond to a tilt of 10 degrees and a second threshold can correspond to a tilt of 15 degrees. There can be any number of thresholds as well as corresponding zoom amounts or factors associated with each threshold.

In accordance an alternate embodiment, the device can enter a continuous zoom mode. For example, as described, a zoom amount can be based on the amount of tilt of the device relative to a reference point, where in response to titling the device relative to the reference point, the amount of zoom is adjusted. This can be considered an absolute zoom control mode. In a continuous zoom control mode approach, titling the device more than a threshold amount from a reference point can activate continuous zooming, where the device continues to zoom at a determined rate until the device is titled back in the starting position. For example, when the device is tilted at least a threshold angle, a zooming operation is applied to the content displayed on the display element where the device continues to zoom the content until the device is positioned in the starting position. Accordingly, if the user tilts the device forward more than a threshold angle relative to a reference point, the content will be zoomed-in on until the device is returned to the starting position.

In accordance with various embodiments, the reference point can be determined in a number of ways. For example, the reference point can be determined using image information acquired using at least one camera of the device or position information of the device acquired using at least one device sensor (e.g., a gyroscope, an accelerometer, etc.). When determining the reference point using image information, in response to activating the zoom mode, one or more images can be analyzed to determine an angle of the viewer's head relative to the device. The angle can be the reference point and can correspond to a horizontal axis running through the device and parallel to the screen. Tilting the device is rotating about the horizontal axis. For example, in the situation where a user zooms-in, the user tilts the device towards the user such as by rotating along the horizontal axis of the device.

In the situation where a device sensor is used to establish the reference point, in response to activating the zoom mode, at least one of the gyroscope or the accelerometer can be used to determine an initial position. The initial position can correspond to a horizontal axis running through the device and parallel to the screen and tilting the device is rotating about the horizontal axis. In this way, the device can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed.

In accordance with various embodiments, the content view control mode can be deactivated in response to one or more events. For example, in response to determining substantially no change in position of the computing device for a predetermined period of time, the content view control mode can be deactivated. In such a situation, the content displayed can be remain in the current state or zoom level, return to a default zoom, or be return to some other zoom level, and the graphical element fades out. Various other approaches can be used as well to deactivate the content view control mode, as may include a double-tap input-based gesture, shaking the device, a voice command, an input-based gesture that includes pressing a physical button, or some other event.

In accordance with various embodiments, detecting a position of the user relative to the device can be determined in a number of ways. For example, a computing device can include a front facing camera (or other front-facing sensor such as an infrared proximity sensor), face-recognition software, and face-tracking software that can be used to detect a change in position of the user as the device is tilted forward or backward relative to a user of the device. For example, in one instance, the front-facing camera can be used to capture an image of the user's face, and the face-recognition software can be used by the device to determine one or more facial features of the user, such as the user's eyes and/or mouth. Based on this determination, the device can determine measurements relative to the size of the facial features, such as the distance between the user's eyes, and the distance between the user's eyes can be used to determine a measure of distance using techniques of photogrammetry, where the measure of distance is the distance between the detected facial feature and the device. As the user tilts the device, the device can use the face-tracking software to track the user's face to determine an amount of tilt based on a change in position and an angle of the camera to the user.

In another approach, two or more cameras, face-recognition software, and face-tracking software can be used to detect a change in position of the user as the device is tilted forward or backward relative to a user of the device. In this instance, two cameras are operating simultaneously (where the camera capture is synched between the two cameras), and the face-detection and face-tracking software is used to determine a distance to the head of the user (or to some feature of the head, such as the eyes), where the distance is determined by triangulating the features between the two cameras using stereopsis. Thereafter, as the user tilts the device, the device can determine an amount of tilt based on a change in position and an angle of the camera to the user. This approach advantageously provides for a higher resolution and lower-noise signal for the range, and is independent of the user (such as the distance between the user's eyes or other measurement of the user), and is instead dependent on a known distance between the two cameras.

In accordance with an embodiment, the techniques described with respect to the photogrammetry and stereopsis can be combined to detect an activation movement of a device performed relative to a user of the device. In this way, using both techniques simultaneously can provide for a more robust method to detect an activation movement, such as against events like the occasional occlusion of one of the two cameras as by a thumb or other object. It should be noted that various alternative methods can be used to detect or otherwise determine an amount of tilt based on a change in position and an angle of the camera to the user can be used within the scope of the embodiments described herein, as will be evident to one or ordinary skill in the art, such as using a computing device having infrared cameras (or other sensors) to lock or otherwise detect a facial feature of a user; determine that the device is titling forward or backward; and determine an amount of angle or tilt as the device is tilted.

In accordance with various embodiments, any of a number of elements can be used to determine changes in relative position and/or orientation between a user and a computing device. As described, the device can include an imaging element that can be used to capture image information for determining a relative position or direction of a user as mentioned above. When using a camera to determine a relative position of a user, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. Accordingly, in some embodiments, a sensor or other such element of a computing device can be used to determine motions of the computing device, which can help adjust point of view determinations. The sensors can be any appropriate sensors capable of providing information about rotations and/or translations of the device, as may include accelerometers, inertial sensors, electronic gyroscopes, magnetic compasses, and the like. Other input elements, such as microphones or proximity sensors, can be used as well in other embodiments. The information from at least some of these elements can be analyzed to determine that the device is titling forward or backward and to determine an amount or angle or tilt as the device is tilted. By determining the amount of tilt, for example, the device can adjust an amount of zoom applied to the displayed content.

In accordance with certain embodiments, the touch-based gesture input can cause the device to enable other image view control modes, such as a brightness mode that can be used to change the relative lightness of the image, a contrast mode that can be used to change the difference between the darkest and lightest areas of an image, or any other image control mode that can be used to manipulate, enhance or otherwise adjust the image by moving the device relative to the user. For example, upon invoking an content view control mode, the user can use a thumb or finger of the hand holding the device to select or interact with one or more user-selectable elements, objects, or portions of the interface displayed on the screen of the device, such as by touching the screen at a location associated with one of the user-selectable elements for at least a determined period of time to activate or change the content view control mode. For example, each user-selectable element can enable an associated content view control mode when selected, and when one of the user-selectable elements is selected, movement of the device such as tilting can cause the content view control mode associated with the selected user-selectable element to be performed at least during the time the user-selectable element is selected, while the device is moved, or for some other period of time or action. A subsequent selection of the same user-selectable element can disable the image view control associated with that user-selectable element. Alternatively, selecting one of the user-selectable elements can toggle between different image view control modes. For example, as described above, an content view control modes can include one of such a zoom mode, a brightness mode, a contrast mode, or any other mode that can be used to manipulate, enhance or otherwise adjust the image, and selecting the user-selectable element can toggle between the different image view control modes.

Figure 4:
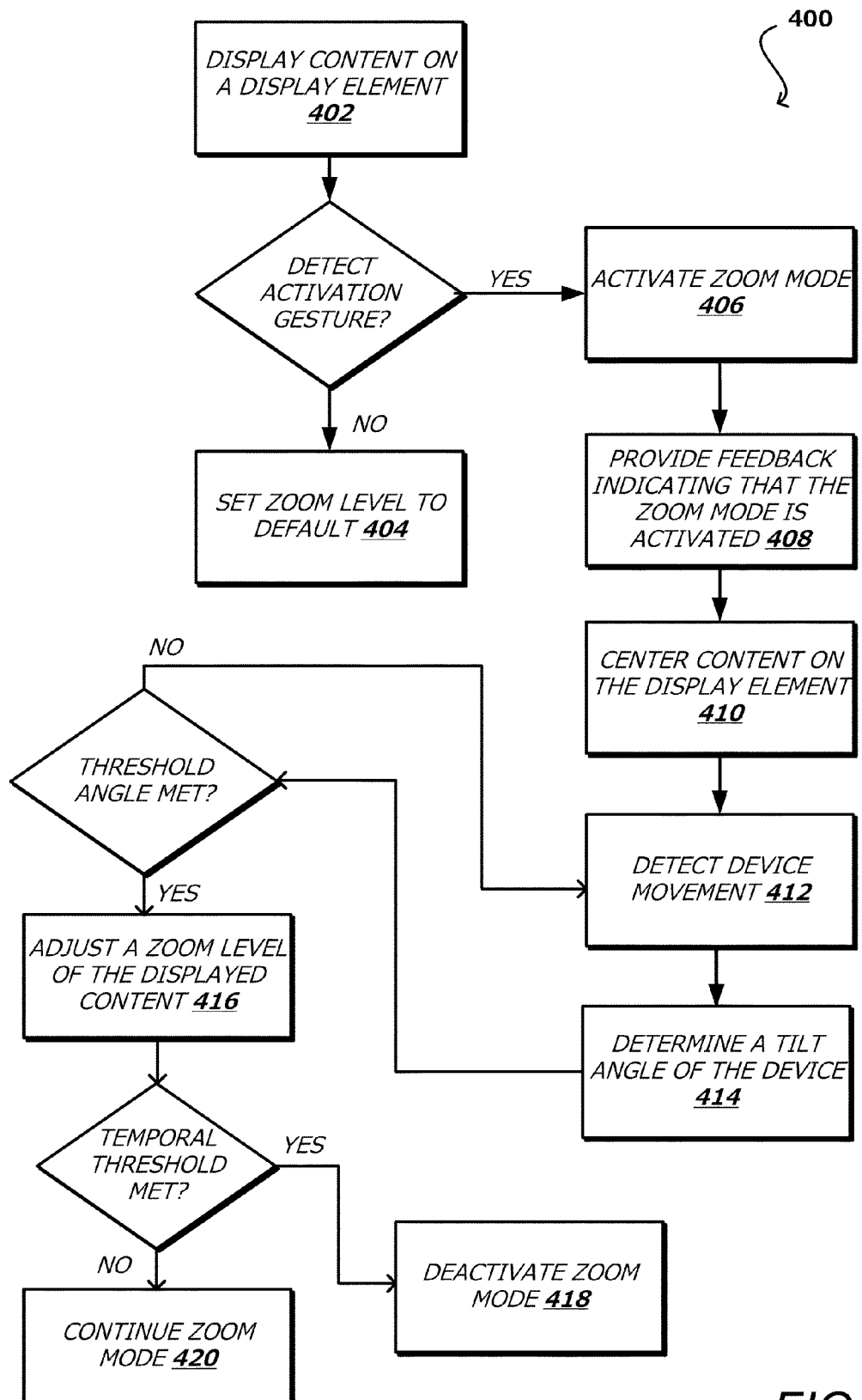
FIG. 4 illustrates an example process for managing a display of content in accordance with various embodiment.

FIG. 4 illustrates an example process 400 for managing a display of content, in accordance with various embodiments. It should be understood that, for any process described herein, that there can be additional or fewer steps performed in similar or alternative orders, or in parallel, within the scope of the various embodiments unless otherwise stated. As described, approaches for managing a display of content, via an electronic device are provided. In particular, various embodiments enable single-handed approaches to adjusting content displayed on a display element of a computing device. For example, content (e.g., an image, video, application data) is displayed 402 on a display element of a computing device. The image can be acquired using one or more camera or other sensor(s) of the computing device. The content can be generated from any number of applications, such as from a mapping application, a web browser, etc. In the situation where no activation gesture is detected, the content view control mode (e.g., zoom mode) is not activated and the amount of zoom can be set 404 or remain at a default level (e.g., 100 percent) and the viewer can view the content displayed at the default level. In the situation where an activation gesture is detected, such as when a touch-based gesture input is detected on an area of interest on the content, the content view mode is activated 406 (e.g., zoom mode). Activating the zoom mode can include, for example, detecting a double-tap on the display element. It should be noted that although a double-tap is used as an activation gesture, the various embodiments described herein are not limited to this particular activation gesture. Various alternative activation movements can be used within the scope of the embodiments described herein, as will be evident to one or ordinary skill in the art, such as a triple-tap, a shaking movement, moving the device away from the user, voice command, pressure input such a "squeeze input", or any other activation gesture, event, or combination thereof. Additionally, in accordance with an embodiment, depressing a button (such as a physical button, volume button, etc.) on the device can be used cause the device to activate a content control view mode, such as a zoom control mode. Thereafter, moving the device while the button is depressed can cause the device to zoom or otherwise adjust the image displayed on the device.

Feedback indicating that the zoom mode is activated can be provided 408. In accordance with various embodiments, feedback can include displaying a graphical element on the area of interest, where the graphical element can indicate that the zoom view mode is activated. In some situations, activating the content view control mode can cause an audio and/or haptic feedback indication that the content view control mode is activated. The area of interest is centered 410 on the display element. For example, an animation such as sliding or otherwise panning the content across the screen can be performed. Various other approaches can be used as well, such as fading in and out the content, where the resulting display includes the area of interest positioned in the center of the display element. In addition in centering the area of interest, the area of interest can be zoomed-in a predefined zoom amount or level. In accordance with various embodiments, zooming-in can include, for example, decreasing the percentage the image shown. The predetermined amount can be based on a number of factors, as may include a type of content displayed. The types of content can include, for example, text, images, video, graphical elements, etc. Accordingly, if the user activates the zoom mode by indicating particular content, the device will apply a particular zoom amount based on the content indicated. For example, if the user activates the zoom mode by double-tapping text, the device will apply a zoom level (e.g., an amount of zoom) such that the at least a certain portion of the text (e.g., a paragraph) is displayed.

A change in position of the computing device relative to a viewer of the display element is detected 412. In various embodiments, the relative position and/or orientation of a viewer of a computing device can be determined using at least one image capture element of the device. For example, the feed from a video camera can be analyzed to locate a relative position of the viewer in the video feed, which can be analyzed to determine the relative direction of the viewer. In other embodiments, one or more digital still cameras can capture images periodically, in response to detected movement of the viewer and/or device, or at other appropriate times, which then can be analyzed to attempt to determine viewer position, as distance can often be determined in addition to direction when analyzing multiple sources of information from different locations. Distance can be determined, for example, using stereoscopic imaging or proximity sensing, among other such options. In some embodiments, infrared (IR) imaging can be used to detect specific features of the viewer, such as the viewer's eyes, for use in determining and/or tracking the location of the viewer. In still other embodiments, changes in the orientation and/or position of the device can be determined using at least one motion sensor of the device, in order to provide for a higher sampling frequency than might otherwise be possible using the image information captured by the camera, or otherwise attempt to improve the relative position determinations. For example, the device can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed.

Based at least in part on the change in position of the computing device, a tilt angle of the computing device with respect to the viewer is determined 414 and a zoom level of the content being displayed is adjusted 416 based at least in part on the angle meeting at least a threshold angle. Accordingly, zooming occurs when a threshold amount of tilt is detected for at least a predetermined period of time. For example, when the device is tilted at least a threshold angle and maintains that position for a predetermined period of time, a zooming operation is applied to the content displayed on the display element. In various embodiments, such an approach may only apply to an initial threshold, wherein changes in the angle of the device greater than the initial threshold result in substantially immediate changes in the zoom applied. As the relative position of the viewer and/or orientation of the device changes, the updated position information can used to adjust the amount of zoom applied to the content. For example, a forward tilt of the device relative to a user holding the device can cause the content displayed on the device to be "zoomed-in", while a backward tilt of the device relative to the user can cause the content displayed on the device to be "zoomed-out". In the situation where In accordance with various embodiments, the zoom mode can be deactivated in response to one or more events. For example, in response to determining substantially no change in position of the computing device for a predetermined period of time, the zoom mode can be deactivated 418. In such a situation, the content displayed can be remain in the current state or zoom level, return to a default zoom, or be return to some other zoom level. In the situation where zoom events are detected within the predetermined period of time, the zoom mode remains activated and the viewer can continue zooming 420. Various other approaches can be used as well to deactivate the content view control mode, as may include a double-tap input-based gesture, shaking the device, a voice command, an input-based gesture that includes pressing a physical button, or some other event.

Figure 5A:
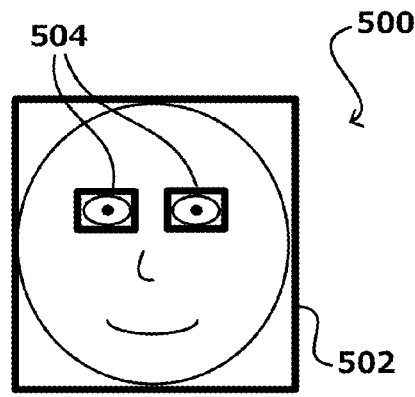
FIGS. 5A-5F illustrate example approaches to determining head position that can be used in accordance with various embodiments.

Various approaches can be utilized for locating one or more desired features of a user's face to determine various aspects useful for determining relative orientation. For example, an image can be analyzed to determine the approximate location and size of a user's head or face. FIG. 5A illustrates an example wherein the approximate position and area of a user's head or face 500 is determined and a virtual "box" 502 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 504 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Figure 5B:
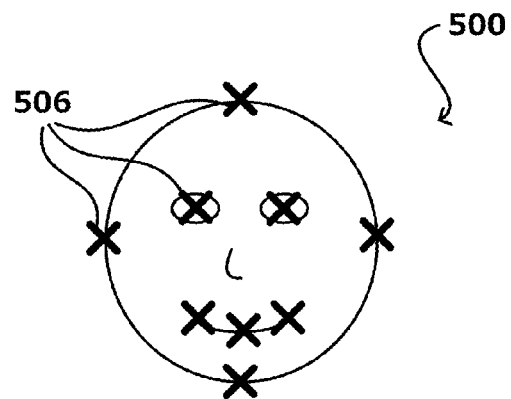

Various other algorithms can be used to determine the location of features on a user's face. For example, FIG. 5B illustrates an example wherein various features on a user's face are identified and assigned a point location 506 in the image. The system thus can detect various aspects of user features and can determine more subtle changes in orientation. Such an approach provides advantages over the general approach of FIG. 5A in certain situations, as various other features can be determined, in case the user's eyes cannot be seen due to glasses, hair, etc.

Figure 5C:
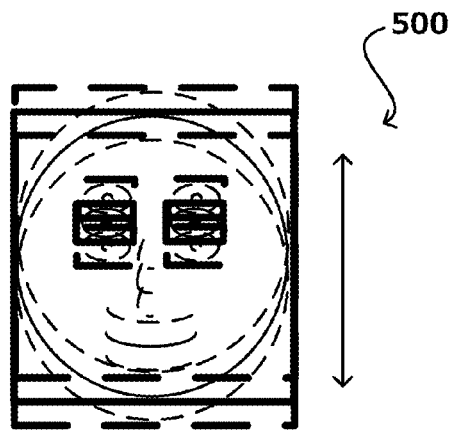
Figure 5D:
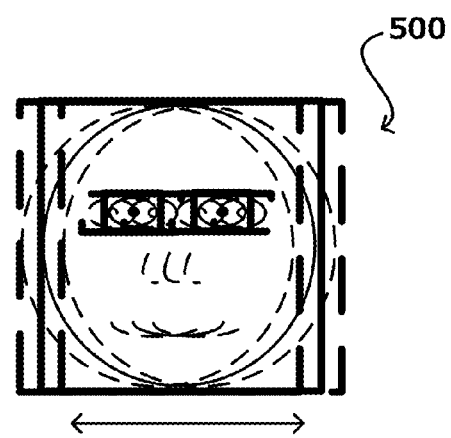
Figure 5E:
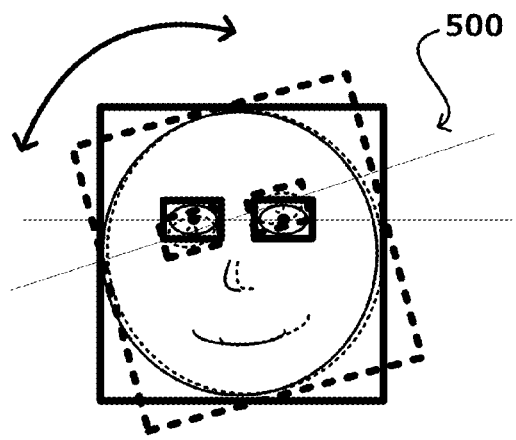
Figure 5F:
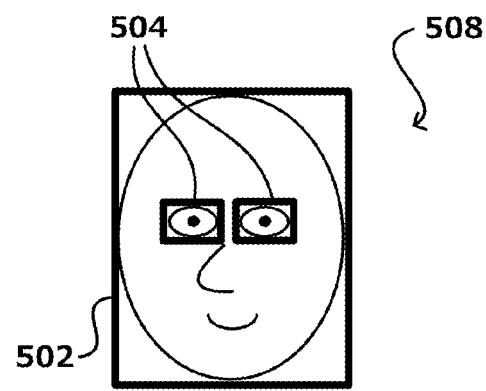

Once the positions of facial features of a user are identified, relative motion between the user and the device can be detected and utilized as input. For example, FIG. 5C illustrates an example where the user's head 500 is moving up and down with respect to the viewable area of the imaging element. As discussed, this could be the result of the user moving his or her head, or the user moving the device up and down, etc. FIG. 5D illustrates a similar example wherein the user is moving right to left relative to the device, through movement of the user, the device, or both. As can be seen, each movement can be tracked as a vertical or horizontal movement, respectively, and each can be treated differently as an input to modify a displayed image. As should be understood, such a process also can detect diagonal or other such movements. FIG. 5E further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input. FIG. 5F illustrates another advantage of using an approach such as that described with respect to FIG. 5B to determine the position of various features on a user's face. In this exaggerated example, it can be seen that the features of a second user's head 508 have a different relative position and separation. Thus, the device also can not only determine positions of features for a user, but can distinguish between different users.

Figure 6A:
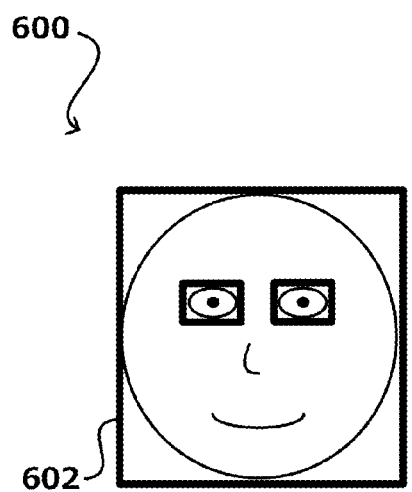
FIGS. 6A and 6B illustrate example approaches to determining changes in the relative distance to a user that can be used in accordance with various embodiments
Figure 6B:
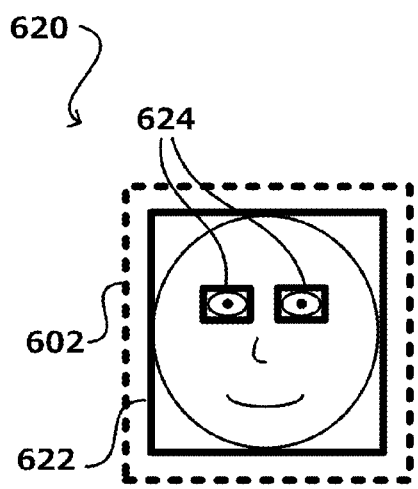

FIGS. 6A and 6B illustrate an example approach that can be used to determine variations in relative distance between a user and a device that can be used in accordance with various embodiments. As in FIG. 5A, the approximate position and area of a user's head or face 600 is determined and a virtual "box" 602 is placed around the face at an initial distance as an indication of distance using one of a plurality of image analysis algorithms for making such a determination. If the user is known, the size of the user's head might be stored such that an actual distance to the user can be calculated based at least in part upon the size of the box 602. If the user is not known, the distance can be estimated or determined using other factors, such as stereoscopic imaging. In some embodiments, determinations will be relative with respect to an initial box size when the actual distance cannot be determined As the distance between the user and the device changes, the size of the virtual box will change as well. For example, in FIG. 6B the distance between the user and the device has increased, such that the user's head 620 appears smaller in the captured image information. Accordingly, the size of the virtual box 622 for the adjusted size of the user's head is smaller than the original box 602 for the initial distance. By monitoring adjustments in the size of the box or another measure of the user's head and/or other such features (e.g., boxes 624), the device can determine an approximate distance and/or change in distance to the user. As discussed, this information can be used to adjust aspects of the displayed image information such as a level of zoom or amount of detail.

Figure 7A:
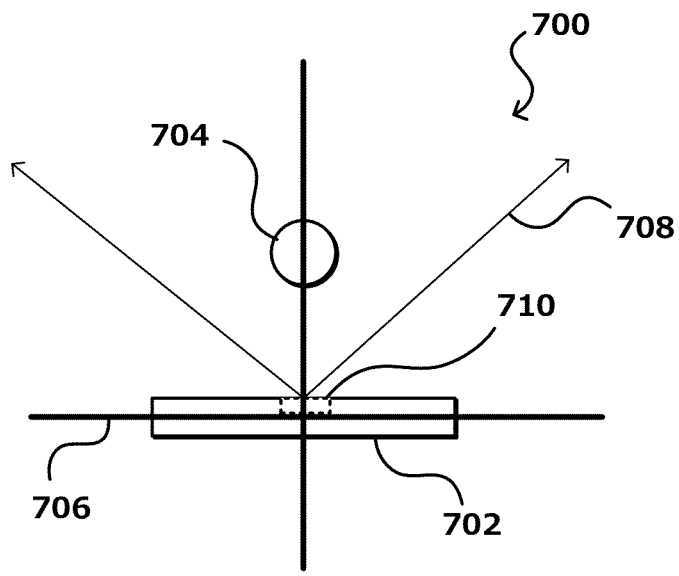
FIGS. 7A and 7B illustrate an example approach to determining device motion that can be utilized in accordance with various embodiments.

For example, FIG. 7A illustrates a "top view" 700 of a computing device 702 operable to capture an image of an object 704 (e.g., a user's head) within an angular view 708 of a camera 710 of the computing device. In this example, the computing device 702 includes at least one orientation- or rotation-determining element, such as an electronic compass or electronic gyroscope, that is able to determine a frame of reference 706 in two or three dimensions with respect to a first orientation of the device. In at least some embodiments, an electronic compass might be used to determine an axis of the frame of reference 706, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 706 or orientation can be determined at or near the time of capture of a first image by a camera 710 of the computing device 702. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 7B:
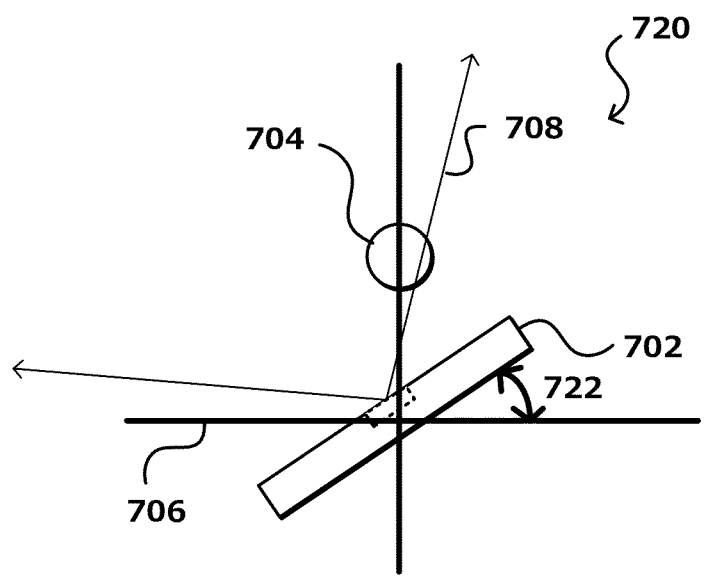

FIG. 7B illustrates a second top view 720 after a change in orientation of the computing device 702. The electronic gyroscope (or other such component or embedded sensor) can detect the change in orientation, in this example corresponding to a change in angle 722 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 722 about a single axis. As illustrated, this causes the object 704 to be moved to the right edge of the field of view 708 of the camera 710. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

Figure 8:
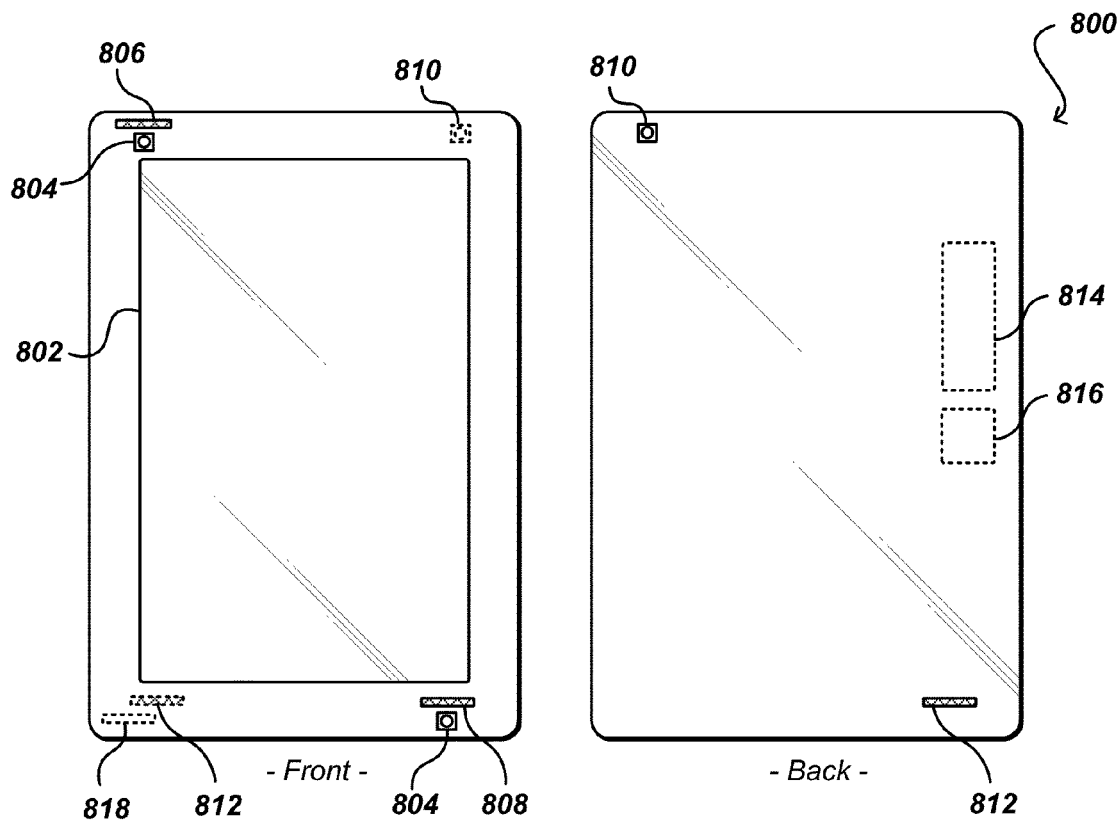
FIG. 8 illustrates front and back views of an example portable computing device that can be used in accordance with various embodiments.

FIG. 8 illustrates front and back views of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device).

Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
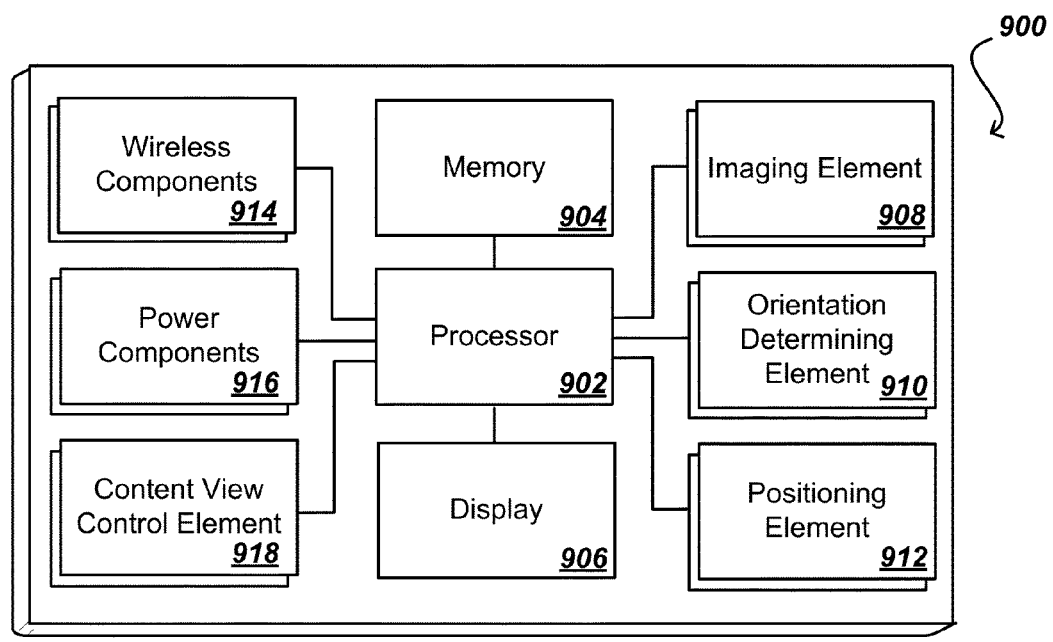
FIG. 9 illustrates an example set of basic components of a portable computing device, such as the device described with respect to FIG. 8.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include a content view control element 918 to, for example, detect a touch-based gesture input on an area of interest of the content, the touch-based gesture input corresponding to at least a double-tap on the display element; activate a content view control mode; display a graphical element at least proximate to the area of interest, the graphical element indicating that the content view control mode is activated; animate a centering of the area of interest on the display element; determine a change in position of the computing device relative to a viewer of the display element; determine a change in an angle of the computing device with respect to the viewer over a predetermined scaling range based at least in part on the change in position of the computing device; and adjust a zoom level of the content being displayed based at least in part on the angle of the computing device meeting at least a threshold angle.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
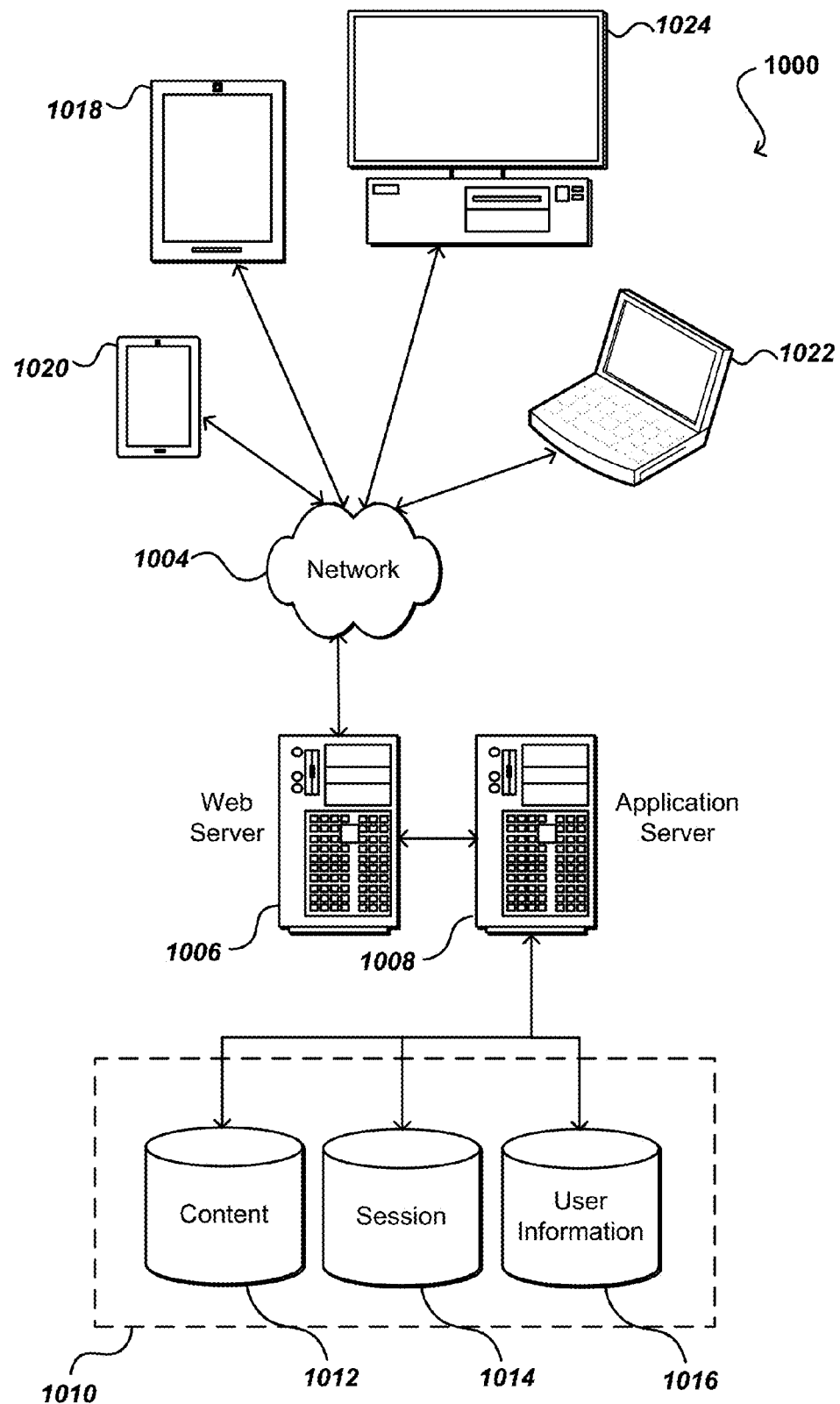
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes electronic client devices 1018, 1020, 1022, and 1024, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client devices 1018, 1020, 1022, and 1024 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto.

In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1018, 1020, 1022 and 1024. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a display element;
    at least one processor coupled to the display element; and
    a memory device coupled to the at least one processor and including instructions that, when executed by the at least one processor, cause the computing device to:
        display a first representation of content at a first scale on the display element;
        detect a double-tap input on the display element corresponding to an area of interest of the content;
        activate a content view control mode at a first time;
        determine a type of the content;
        determine, based on the type of the content, a second representation of the content at a default scale different from the first scale;
        display at least a portion of the second representation of the content at a center of the display element, the portion of the second representation of the content corresponding to the area of interest of the content that received the double-tap input;
        display a graphical element proximate to the portion of the second representation of the content, the graphical element indicating that the content view control mode is activated;
        determine a starting angle of the computing device relative to a face;
        determine a first changed angle of the computing device relative to the starting angle;
        display, at a first frame rate, a change of the content from the second representation to a third representation of the content at a second scale on the display element based at least in part on the first changed angle meeting at least a first threshold angle;
        determine a second changed angle of the computing device relative to the first changed angle; and
        display, at a second frame rate different from the first frame rate, a change of the content from the third representation to a fourth representation of the content at a third scale on the display element based at least in part on the second changed angle meeting at least a second threshold angle.

2. The computing device of claim 1, wherein the instructions when executed further cause the computing device to:
    zoom-in on the area of interest in response to the first changed angle corresponding to a forward tilt of the computing device relative to the face; or
    zoom-out on the area of interest in response to the first changed angle corresponding to a backward tilt of the computing device relative to the face.

3. The computing device of claim 1, further comprising a camera, and wherein the instructions when executed further cause the computing device to:
    acquire a first image using the camera, the first image including a first representation of the face;
    determine a first angle of the face with respect to the computing device;
    acquire a second image using the camera, the second image including a second representation of the face; and determine a second angle of the face with respect to the computing device, wherein the first changed angle of the computing device with respect to the face is based at least in part upon a change between the first angle and the second angle and an angular field of view of the camera.

4. The computing device of claim 1, wherein the instructions when executed further cause the computing device to:
determine the content control view mode is activated;
determine no changed angle of the computing device with respect to the face meets at least the first threshold angle for a predetermined period of time; and
exit the content view control mode.

5. A computer implemented method, comprising:
determining a first position of a computing device relative to a face;
displaying a first representation of content on a display element of the computing device;
detecting a double-tap input on the display element corresponding to an area of interest of the content, the double-tap input associated with activation of a content view control mode for controlling display of the content;
determining a type of the content;
determining, based on the type of the content, a default representation for the content that is different from the first representation;
displaying at least a portion of the default representation of the content at a center of the display element, the portion of the default representation of the content corresponding to the area of interest of the content that received the double-tap input;
displaying a graphical element proximate to the portion of the default representation of the content, the graphical element indicating that the content view control mode is activated;
determining a second position of the computing device relative to the first position;
displaying, at a first rate, a change of the content from the default representation to a second representation of the content on the display element based at least in part on a first amount of change from the first position to the second position meeting a first threshold amount of change;
determining a third position of the computing device relative to the second position; and
displaying, at a second rate different from the first rate, a change of the content from the second representation to a third representation of the content on the display element based at least in part on a second amount of change from the second position to the third position meeting a second threshold amount of change.

6. The computer implemented method of claim 5, wherein the change from the first position to the second position corresponds to one of a forward tilt of the computing device, a backward tilt of the computing device, a forward motion along a primary axis of the computing device, or a backward motion along the primary axis relative to the face.

7. The computer implemented method of claim 5, further comprising:
acquiring a first image using a camera of the computing device, the first position being determined based at least in part on a first location of a first representation of the face in the first image; and acquiring a second image using the camera, the second position being determined based at least in part on a second location of a second representation of the face in the second image,
wherein the first amount of change from the first position to the second position is based at least in part on a change between the first location and the second location, and an angular field of view of the camera.

8. The computer implemented method of claim 5, further comprising:
determining no amount of change from the third position to a fourth position of the computing device relative to the third position meets the second threshold amount of change for a predetermined period of time; and
deactivating the content view control mode.

9. The computer implemented method of claim 5, wherein the double-tap input corresponds to a selection of a user interface element associated with one of a plurality of image controls.

10. The computer implemented method of claim 9, wherein one of the plurality of image controls corresponds to a modification of a magnification, a saturation, a contrast, or an exposure of a representation of the content.

11. The computer implemented method of claim 5, further comprising:
determining an area of interest of the first representation of the content corresponding to the double-tap input; and
displaying the portion of the default representation of the content corresponding to the area of interest at the center of the display element.

12. The computer implemented method of claim 5, wherein different representations of the content corresponding to the content at different scales.

13. The computer implemented method of claim 5, further comprising:
providing feedback indicating that the content view control mode is activated, the feedback including at least one of a graphical element displayed on the display element corresponding to an area of interest of the first representation, a sound, or a haptic response.

14. The computer implemented method of claim 5, wherein the first position is based at least in part on an angle of tilt of the computing device relative to the face.

15. The computer implemented method of claim 14, further comprising:
detecting a first amount of change in the angle of tilt that meets the first threshold amount of change;
rendering the change of the content from the default representation to the second representation;
detecting a second amount of change in the angle of tilt that meets the second threshold amount of change; and
rendering the change of the content from the second representation to the third representation,
wherein the second rate is greater than the first rate, and wherein the second amount of change in the angle of tilt is greater than the first amount of change in the angle of tilt.

16. The computer implemented method of claim 5, further comprising:
displaying, at a third rate different from the first rate and the second rate, a change of the content from the first representation to the default representation on the display element.

17. A computing device, comprising:
a computing device processor;

a memory device including instructions that, when executed by the computing device processor, cause the computing device to:
  determine a first position of the computing device relative to a face;
  display a first representation of content on a display element of the computing device;
  detect a double-tap input on the display element corresponding to an area of interest of the content, the double-tap input associated with activation of a content view control mode for controlling display of the content;
  determine a type of the content;
  determine, based on the type of the content, a default representation of the content, that is different from the first representation;
  display at least a portion of the default representation of the content at a center of the display element, the portion of the default representation of the content corresponding to the area of interest of the content that received the double-tap input;
  display a graphical element proximate to the portion of the default representation of the content, the graphical element indicating that the content view control mode is activated;
  determine a second position of the computing device relative to the first position;
  display, at a first rate, a change of the content from the default representation to a second representation of the content on the display element based at least in part on a first amount of change from the first position to the second position meeting a first threshold amount of change;
  determine a third position of the computing device relative to the second position; and
  display, at a second rate different from the first rate, a change of the content from the second representation to a third representation of the content on the display element based at least in part on a second amount of change from the second position to the third position meeting a second threshold amount of change.

18. The computing device of claim 17, wherein the instructions when executed further cause the computing device to:
  determine no amount of change from the third position to a fourth position of the computing device relative to the third position meets the second threshold amount of change for a predetermined period of time; and
  deactivate the content view control mode.

19. The computing device of claim 17, wherein the instructions when executed further cause the computing device to:
  determine an area of interest of the first representation of the content corresponding to the double-tap input; and
  display the portion of the default representation of the content corresponding to the area of interest at the center of the display element.

20. The computing device of claim 17, wherein the instructions when executed further cause the computing device to:
  displaying, at a third rate different from the first rate and the second rate, a change of the content from the first representation to the default representation on the display element.

* * * * *